United States Patent [19]

Goldberg

[11] Patent Number: 5,444,438

[45] Date of Patent: Aug. 22, 1995

[54] METHOD AND APPARATUS FOR REMOTE MEMORY MANAGEMENT IN AN ACKNOWLEDGE-BACK SELECTIVE CALL COMMUNICATION SYSTEM

[75] Inventor: Steven J. Goldberg, Coral Springs, Fla.

[73] Assignee: Motorola, Inc., Schaumburg, Ill.

[21] Appl. No.: 231,593

[22] Filed: Apr. 22, 1994

[51] Int. Cl.$^6$ ............................................. G08B 5/22
[52] U.S. Cl. .............................. 340/825.44; 379/56; 455/38.1
[58] Field of Search ................... 340/825.44, 825.48; 455/38.1, 38.2; 379/56, 57; 370/94.1, 94.2, 92, 61

[56] References Cited

U.S. PATENT DOCUMENTS

| | | | |
|---|---|---|---|
| 4,247,908 | 1/1981 | Lockhart, Jr. et al. | 455/38.1 |
| 4,851,829 | 7/1989 | DeLuca et al. | 340/825.44 |
| 4,868,560 | 9/1989 | Oliwa et al. | 340/825.44 |
| 4,873,520 | 10/1989 | Fisch et al. | 340/825.44 |
| 4,928,096 | 5/1990 | Leonardo et al. | 340/825.44 |
| 4,949,085 | 8/1990 | Fisch et al. | 340/825.44 |
| 5,258,739 | 11/1993 | DeLuca et al. | 455/38.1 |
| 5,315,586 | 5/1994 | Charvillat | 370/61 |
| 5,323,148 | 6/1994 | Olazabal et al. | 379/56 |

Primary Examiner—Donald J. Yusko
Assistant Examiner—Gregg V. Miller
Attorney, Agent, or Firm—R. Louis Breeden

[57] ABSTRACT

A method and apparatus perform remote memory management in an acknowledge-back selective call communication system (100) comprising an infrastructure (102) and a selective call receiver (120). The infrastructure (102) transmits (904) a notification (406) of a pending message for the receiver (120). The receiver (120) reports (906) in response a memory value (414) specifying space available in a memory (322) for storing the pending message. The infrastructure (102) compares (908) the memory value (414) with the length of the pending message to see if sufficient memory space is available to store the pending message in the receiver (120). The infrastructure (102) controls further processing of the pending message based on the result of the comparison.

24 Claims, 8 Drawing Sheets

METHOD AND APPARATUS FOR REMOTE MEMORY MANAGEMENT IN AN ACKNOWLEDGE-BACK SELECTIVE CALL COMMUNICATION SYSTEM

FIELD OF THE INVENTION

This invention relates in general to selective call communication systems, and more specifically to a method and apparatus for performing remote memory management in an acknowledge-back selective call communication system.

BACKGROUND OF THE INVENTION

Communication systems utilizing selective call receivers having a memory within for storing selective call messages received from callers are well known in the art. Such receivers allow a user to see or hear a received message at a time later than the exact moment of message transmission. Typically, the stored messages are retained until they are manually erased by the user, or are automatically erased by the receiver when additional memory space is needed for a new incoming message.

Some selective call receivers allow the user to "lock" selected messages, such that the locked messages will not be automatically erased by a new incoming message. A problem that can occur when a user locks a plurality of received messages is that there may be insufficient memory space available in the receiver for storing a new incoming message, resulting in loss of one or more new messages. In addition, the user sending the message often is unaware that the problem is occurring, and thus does not take steps to correct the problem. The problem is of course more likely to happen when the new message is a relatively lengthy one.

Thus, what is needed is a method and apparatus for providing a solution to the aforementioned problem. A method and apparatus is needed that can control the loss of new incoming messages when there is insufficient memory available in the selective call receiver for storing the new messages. A method and apparatus that can bring the problem to the attention of the user for possible correction is also needed.

SUMMARY OF THE INVENTION

An aspect of the present invention is a method of remote memory management in an acknowledge-back selective call communication system comprising an infrastructure and a selective call receiver that receives a plurality of messages having a length that is variable. The messages each originate from a source and are transmitted by the infrastructure. The selective call receiver stores the plurality of messages in a memory. The method comprises the steps of transmitting, from the infrastructure to the selective call receiver, a notification of a pending message; and reporting in response to the notification, from the selective call receiver to the infrastructure, a memory value specifying an amount of space available in the memory for storing the pending message. The method further comprises the steps of comparing by the infrastructure the memory value with the length of the pending message to make a determination of whether sufficient memory space is available to store the pending message in the selective call receiver, and controlling further processing of the pending message by the infrastructure in accordance with the determination made in the comparing step.

Another aspect of the present invention is an acknowledge-back selective call communication system that performs remote memory management. The system comprises an infrastructure that transmits a plurality of messages having a length that is variable, and a selective call receiver coupled to the infrastructure for receiving and storing selected ones of the plurality of messages. The infrastructure comprises a controller for controlling the infrastructure to process a pending message originated by a source. The controller comprises an input element coupled to the source for receiving the pending message. The infrastructure further comprises a message transmitter coupled to the controller for transmitting to the selective call receiver a notification of the pending message. The selective call receiver comprises a message receiver coupled to the message transmitter for receiving the notification and the selected ones of the plurality of messages, and a memory coupled to the message receiver for storing the selected ones of the plurality of messages. The selective call receiver further comprises a processor coupled to the memory for controlling the selective call receiver, and a selective call address element coupled to the processor for selecting messages intended for the selective call receiver. The selective call receiver also comprises an acknowledge transmitter coupled to the processor for transmitting to the infrastructure in response to the notification a memory value specifying an amount of space available in the memory for storing the pending message. The infrastructure further comprises an acknowledge receiver coupled to the acknowledge transmitter for receiving the memory value. The controller comprises a comparator element coupled to the acknowledge receiver for comparing the memory value with the length of the pending message to make a determination of whether sufficient memory space is available to store the pending message in the selective call receiver, and for controlling the processing of the pending message in accordance with the determination made.

DESCRIPTION OF THE PREFERRED EMBODIMENT

Acknowledge-back selective call communication systems were developed in the late 1980's. Such systems have utilized an acknowledge-back transmitter within a selective call receiver to send an acknowledge signal back to the infrastructure from which a message has been received. The purpose of the acknowledge signal typically has been to confirm receipt of the message and further to allow a user of the selective call receiver to generate a brief response having a meaning such as "cannot comply", "will comply immediately", "will comply later", etc. Siwiak et al U.S. Pat. No. 4,875,038 which describes an acknowledge-back selective call communication system, is hereby incorporated herein by reference.

Figure 1:
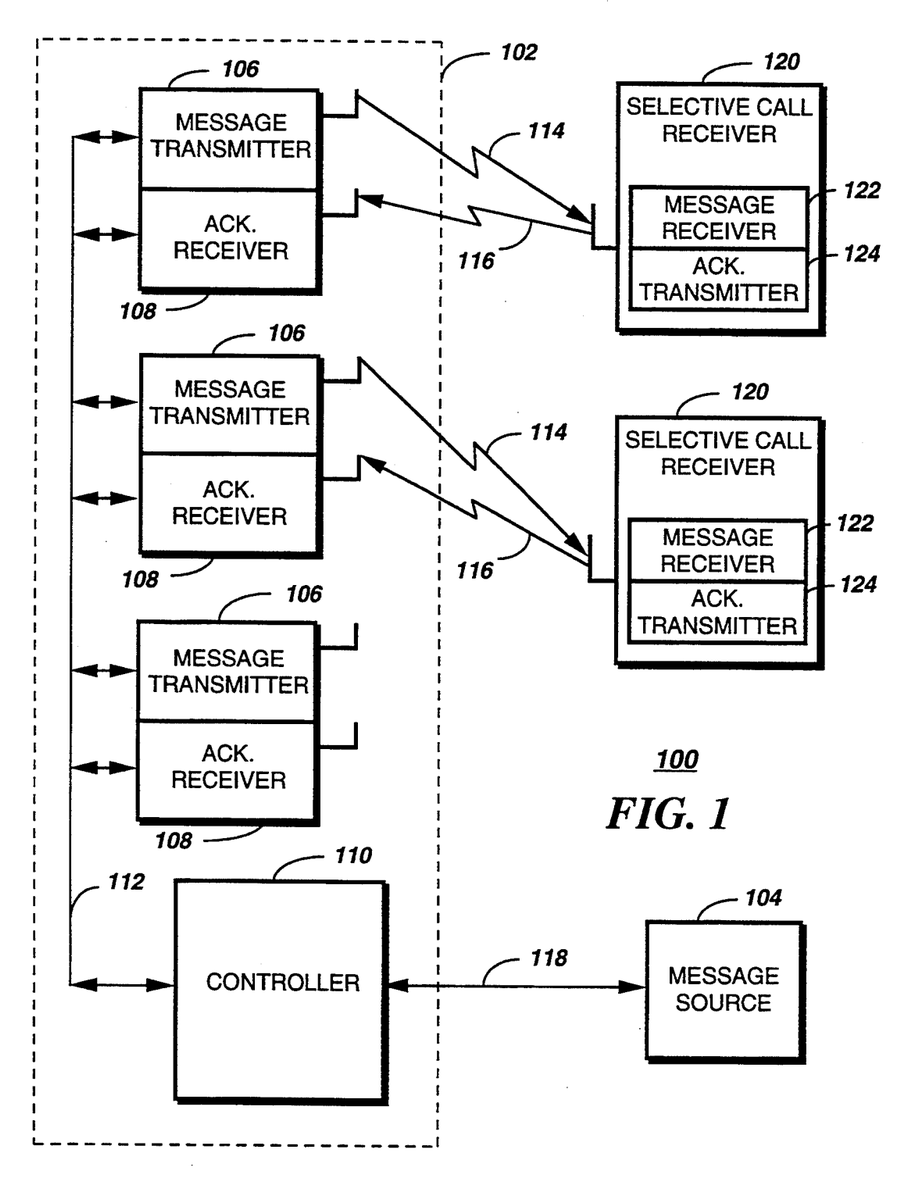
FIG. 1 is an electrical block diagram of an acknowledge-back selective call communication system including an infrastructure and a selective call receiver in accordance with the preferred embodiment of the present invention.

The preferred embodiment of the present invention adds a novel remote memory management capability to an acknowledge-back selective call communication system, as will be described in detail herein below. FIG. 1 depicts an electrical block diagram of an acknowledge-back selective call communication system 100 including an infrastructure 102 and at least one selective call receiver 120 in accordance with the preferred embodiment of the present invention. The infrastructure 102 includes at least one message transmitter 106 linked by an outbound radio link 114 with a message receiver 122 in the selective call receiver 120 for transmitting selective call messages thereto. The infrastructure also includes at least one acknowledge receiver 108 linked by an inbound radio link 116 with an acknowledge transmitter 124 in the selective call receiver 120 for receiving an acknowledge signal therefrom.

While FIG. 1 depicts a one-to-one correspondence between the message transmitter 106 and the acknowledge receiver 108, it will be appreciated that other relationships can exist as well. For example, each message transmitter 106 can be associated with a plurality of acknowledge receivers 108. This relationship is typical in a system in which the message transmitter 106 is a high-power, i.e., long range, transmitter, while the acknowledge transmitter 124 is a low-power, i.e., short range, transmitter. Such a system requires multiple, geographically dispersed acknowledge receivers 108 for reliable reception of the acknowledge transmitter 124 throughout the coverage area of the message transmitter 106.

Transactions that take place over the radio links 114, 116 preferably utilize one of the well-known selective call signaling protocols, such as Golay Sequential Code (GSC) or Post Office Code Standardization Advisory Group (POCSAG) protocol, although it will be appreciated that other signaling protocols can be utilized as well. The message transmitters 106 and the acknowledge receivers 108 are coupled by a conventional communication link 112 to a controller 110 for controlling the infrastructure. The controller 110 is coupled by at least one conventional input link 118 to at least one message source 104 for originating a message intended for one of the selective call receivers 120.

Preferably, the acknowledge receiver 108 is a conventional double-conversion, narrowband FSK receiver, and the acknowledge transmitter 124 is a conventional low-power, narrowband, FSK transmitter. Preferably, the message transmitter 106 is similar to a model C73 PURC 5000 ® transmitter, the hardware of the controller 110 is similar to that of the MPS 2000 ™ paging control center, and the message receiver 122 is similar to that of a model A03KLB5962CA ADVISOR ® pager, all manufactured by Motorola, Inc. of Schaumburg, Ill. It will be appreciated that other similar hardware may be used as well to construct the acknowledge-back selective call communication system 100.

The message source 104 is preferably a person calling from a telephone via the Public Switched Telephone Network (PSTN). Alternatively, the message source 104 may comprise a keyboard/display terminal, a facsimile machine, or a computer generating a message either automatically or under control of a user. The message itself preferably comprises numeric and alphanumeric characters, graphics, or voice. It will be appreciated that other types of message conveyances and message generating devices can also be utilized for the message and the message source 104. It will be further appreciated that the input link 118 can comprise a telephone line or trunk circuit, a wireless link, a dedicated wireline, a packet switched network, or other kind of communication link, as well as the PSTN.

Briefly, in operation, the message source 104 preferably inputs a message and an intended selective call receiver identifier (ID) into the acknowledge-back selective call communication system 100. The message and ID, for example, could be the telephone number of the message source and the address of the intended selective call receiver 120, entered as dual-tone multifrequency signals (DTMF) from a push-button telephone dial. The controller 110 stores the message and ID in a memory therein, and, in accordance with the preferred embodiment of the present invention, sends the ID and a notification of the pending message to the message transmitters 106.

The message transmitters 106 transmit the ID and the notification of the pending message over the outbound radio link 114. The selective call receiver 120 that matches the ID decodes the notification and in response transmits the ID and a memory value, utilizing the acknowledge transmitter 124. The memory value specifies the amount of space available in a memory of the selective call receiver 120 for storing the pending message. The acknowledge receiver 108 receives the ID and the memory value and sends them to the controller 110 over the communication link 112. The controller 110 then compares the memory value with the length of the pending message for the selective call receiver 120 matching the ID.

Preferably, the ID transmitted from the selective call receiver 120 is the same as the ID transmitted from the message transmitters 106. Alternatively, the ID transmitted from the selective call receiver 120 can be a different ID, e.g., an abbreviated form of the ID transmitted from the message transmitters 106. The transmission of the ID by the selective call receiver 120 can be eliminated entirely, provided that sufficient information can be determined by the controller 110 from the transmission of the selective call receiver 120 to uniquely identify the responding selective call receiver 120. For example, if the system is designed such that the selective call receiver 120 responds a predetermined interval after the transmission of the notification, then the time of the response can be used to uniquely identify the responding selective call receiver 120.

If the memory value is sufficient to store the pending message in the selective call receiver 120, then the controller 110 sends the ID and the pending message over the communication link 112 to the message transmitters 106, which transmit the ID and the pending message to the selective call receiver 120. The controller 110 then preferably deletes the pending message from its memory. If, on the other hand, the memory value is insufficient to accommodate the length of the pending message, the controller 110 retains the pending message in the memory therein for later transmission and then sends the ID and an "insufficient memory" signal over the communication link 112 to the message transmitters 106, which then transmit the ID and the "insufficient memory" signal to the selective call receiver 120.

The selective call receiver 120 indicates to the user that memory space is insufficient by generating an audible, tactile, or visible indication in a manner well known in the art. If the user elects to make additional memory space available in the selective call receiver 120 (by deleting one or more messages stored therein), then the selective call receiver 120 preferably will notify the controller 110 that more memory is available. This is accomplished by transmitting a new memory value from the selective call receiver 120 to the controller 110 in a manner similar to that used to transmit the earlier memory value. If the controller 110 determines that the new memory value indicates that memory space in the selective call receiver 120 is now sufficient to accommodate the length of the pending message, then the controller 110 sends the ID and the pending message over the communication link 112 to the message transmitters 106, which transmit the ID and the pending message to the selective call receiver 120. The controller 110 then preferably deletes the pending message from its memory. The operational details and protocols of the system in accordance with the preferred embodiment of the present invention are described more fully herein below.

Figure 2:
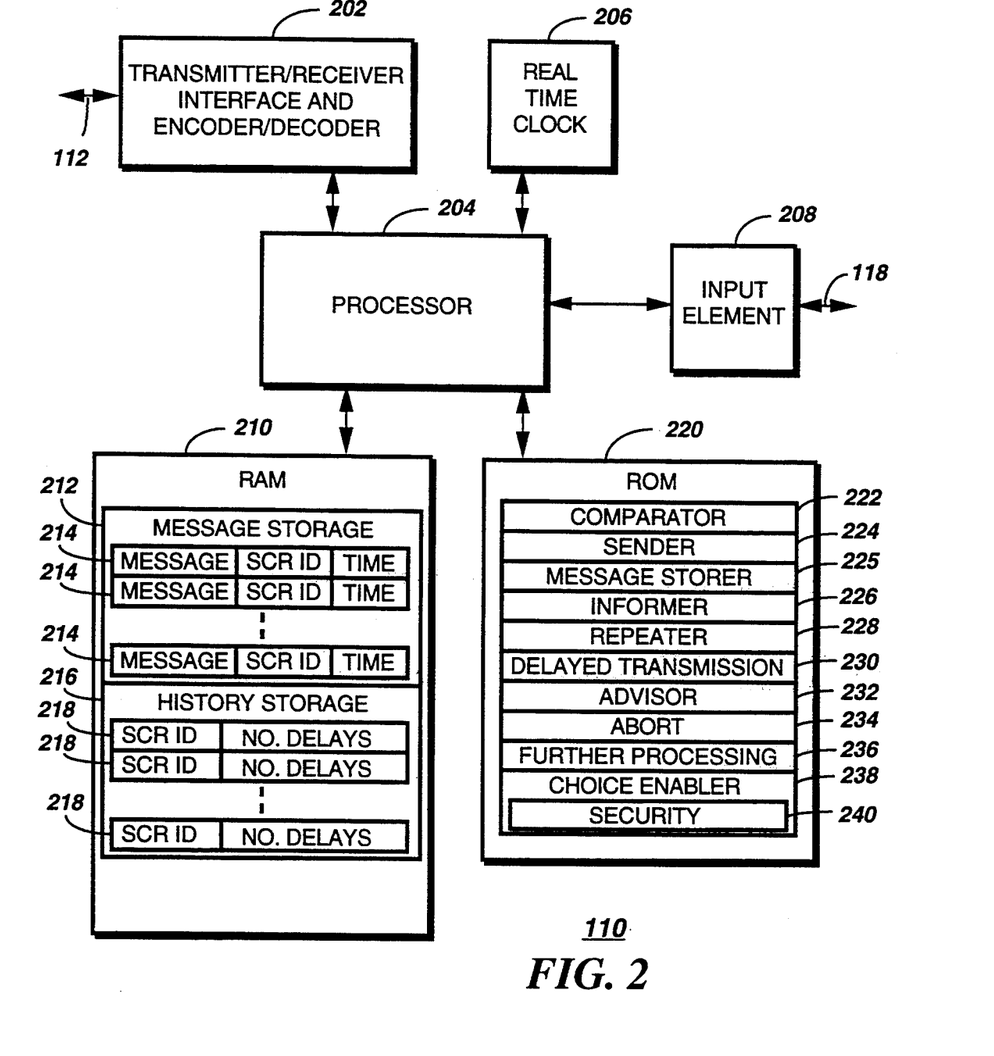
FIG. 2 is an electrical block diagram of a controller within the infrastructure in accordance with the preferred embodiment of the present invention.

FIG. 2 is an electrical block diagram of the controller 110 within the infrastructure 102 in accordance with the preferred embodiment of the present invention. The controller 110 comprises a transmitter/receiver interface and encoder/decoder 202 for communicating with the message transmitters 106 and the acknowledge receivers 108 over the communication link 112. The transmitter/receiver interface and encoder/decoder 202 is coupled to a processor 204, which controls the operation of the controller 110. The processor 204 is coupled to a real time clock 206 for providing a time stamp for events occurring in the communication system 100. The processor 204 is also coupled to an input element 208 for receiving messages from the message source 104 over the input link 118.

The processor 204 is further coupled to a random access memory (RAM) 210 for storing items requiring temporary storage. The RAM comprises a message storage area 212 for storing pending received messages. The message storage area 212 comprises a plurality of message records 214 containing a message, an ID of the selective call receiver 120 associated with the message, and a time stamp associated with the message. The RAM 210 further comprises a history storage area 216 for storing a history of messages delayed due to lack of memory in the selective call receiver 120. The history storage area 216 comprises a plurality of history records 218 containing an ID of a selective call receiver 120 and a count of the number of messages for the identified selective call receiver 120 that have been delayed due to lack of memory in the selective call receiver 120.

The processor 204 is also coupled to a read-only memory (ROM) 220 comprising firmware elements for controlling the processor 204. The firmware elements comprise a comparator element 222 for determining length of a pending message in a conventional manner. The comparator element 222 compares the memory value received from the selective call receiver 120 with the length of the pending message for the selective call receiver 120 to make a determination of whether sufficient memory space is available to store the pending message in the selective call receiver 120, and to control the processing of the pending message in accordance with the determination made.

The firmware elements further comprise a sender element 224 for sending the pending message to the selective call receiver 120 in response to determining by the comparator element that sufficient memory space is available, and a message storer element 225 for retaining the pending message in storage in the controller 110 for later transmission in response to determining by the comparator element 222 that insufficient memory space is available in the selective call receiver 120.

The firmware elements also comprise an informer element 226 for informing the selective call receiver 120 that the pending message will be delayed because of insufficient memory space available in the selective call receiver 120, in response to determining by the comparator element 222 that insufficient memory space is available. In addition, the firmware elements include a repeater element 228 for retransmitting the notification of the pending message after a predetermined delay, in response to having determined subsequent to a most recent prior transmission of the notification of the pending message that insufficient memory space was available in the selective call receiver 120.

Also included in the firmware elements is a delayed transmission element 230 for transmitting to the selective call receiver the pending message stored, in response to receiving a new memory value from the selective call receiver that indicates that sufficient memory space has become available to store the pending message in the selective call receiver. Another of the firmware elements is an advisor element 232 for advising the message source 104 that the pending message will not be sent to the selective call receiver 120 until additional memory space becomes available therein, in response to determining by the comparator element 222 that insufficient memory space is available.

Yet another of the firmware elements is an abort element 234 for aborting transmission of additional packets of the pending message, in response to determining by the comparator element 222 that insufficient memory space is available. Also included is a choice enabler element 238 for enabling the message source 104, in response to determining by the comparator element 222 that insufficient memory space is available, to choose a further message processing step. The further message processing step is selected from: (1) canceling the pending message, (2) delivering the pending message after sufficient memory becomes available in the selective call receiver 120, and (3) delivering the pending message by overwriting other messages stored in the memory of the selective call receiver 120. The choice enabler element 238 also includes a security element 240 for requiring entry of a password before enabling the message source 104 to choose to deliver the pending message by overwriting other messages stored in the memory of the selective call receiver 120.

Lastly, the firmware elements comprise a further processing element 236 for further processing the pending message by the communication system 100 in accordance with the further message processing step chosen by the message source 104. The operation of the controller 110 in accordance with the preferred and alternative embodiments of the present invention is also described in further detail herein below.

As stated herein above, the hardware of the controller 110 is similar to that of the MPS 2000 ™ paging control center. It will be appreciated that other types of memory, e.g., magnetic disk memory, optical memory, electrically erasable programmable random access memory (EEPROM), can be substituted as well for the RAM 210 and the ROM 220.

Figure 3:
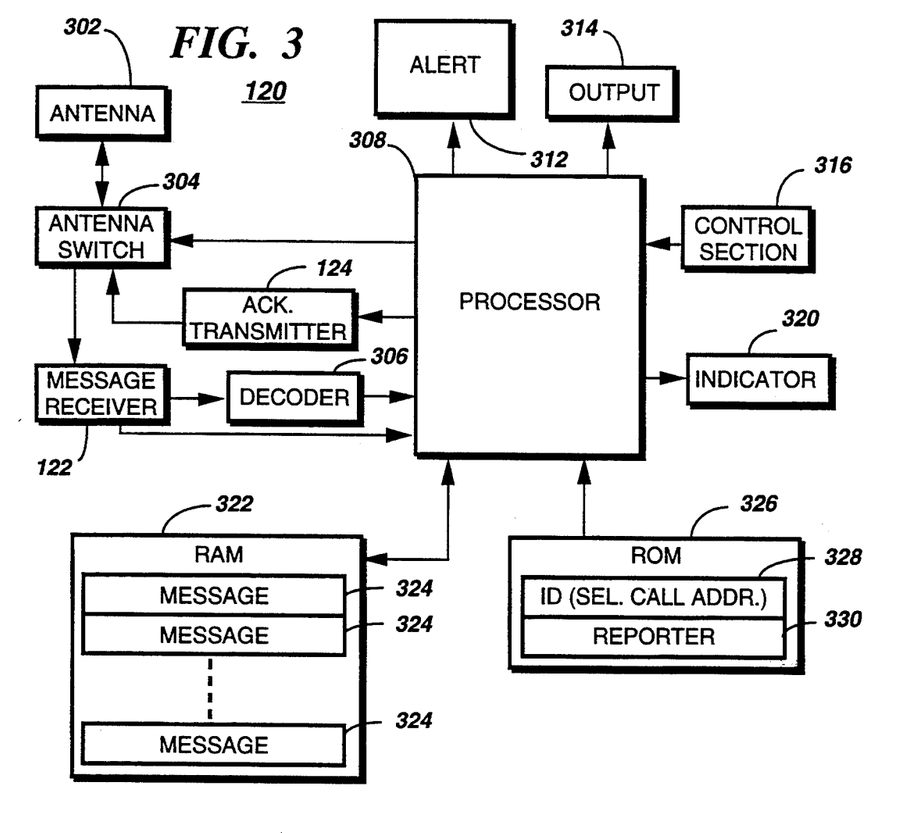
FIG. 3 is an electrical block diagram of the selective call receiver in accordance with the preferred embodiment of the present invention.

FIG. 3 is an electrical block diagram of the selective call receiver 120 in accordance with the preferred embodiment of the present invention. The selective call receiver 120 comprises an antenna 302 for intercepting the messages transmitted from the message transmitters 106 as radio signals. The antenna 302 is coupled to a conventional antenna switch 304 for steering the radio signals therefrom. The antenna switch is coupled to a processor 308 for control thereby. The antenna switch 304 is further coupled to the message receiver 122 for demodulating the radio signals steered therefrom. The message receiver 122 is coupled to a decoder 306 and to the processor 308 for decoding and processing information carried in the radio signals. The processor 308 is coupled to a memory 322, e.g., a conventional random access memory (RAM), for storing the messages received in memory locations 324 therefor. The processor 308 is also coupled to an output element 314, such as a conventional liquid crystal display (LCD) or a loudspeaker, for visibly or audibly outputting the messages received.

The processor 308 is further coupled to a control section 316, comprising well-known switches and buttons, for allowing a user to control the selective call receiver 120. In addition, the processor 308 is coupled to an alert element 312, e.g., a conventional piezoelectric transducer (PZT) or lamp for generating an audible or visible alert in response to receiving information intended for the selective call receiver 120. An indicator 320, e.g., a conventional PZT, light emitting diode (LED), or LCD, is also coupled to the processor 308 for providing an audible or visible indication to the user that there is insufficient memory in the selective call receiver 120 to receive a pending message. It will be appreciated that the indicator 320 can be integrated with either the output element 314 or the alert element 312, or both, as well.

The processor 308 is also coupled to the acknowledge transmitter 124 for controlling the generation of acknowledge messages therefrom. The acknowledge transmitter 124 is coupled to the antenna switch 304 for steering the acknowledge messages to the antenna 302 for transmission to the infrastructure 102. The processor 308 is further coupled to a read-only memory (ROM) 326 comprising firmware elements including a selective call address 328 for uniquely identifying the selective call receiver 120. The firmware elements preferably also include a reporter element 330 for reporting a new memory value to the infrastructure, in response to an increase in space available in the RAM 322 for storing the pending message. The reporter element 330 is activated whenever the increase occurs after the selective call receiver 120 has been informed by the infrastructure that the pending message is delayed because of insufficient memory space available in the selective call receiver 120.

It will be appreciated that other types of non-volatile memory, e.g., EEPROM, battery-backed-up RAM, programmable read-only memory (PROM), etc., can be substituted for the ROM 326. It will be further appreciated that the processor 308, the RAM 322, the ROM 326, and the decoder 306 can be combined in whole or in part as a contiguous integrated circuit device. It will also be appreciated that the antenna switch 304 can be replaced by a circulator or by dual antennas, as well, and that either simplex or full duplex transmission/reception can be utilized by the selective call receiver 120.

Figure 4:
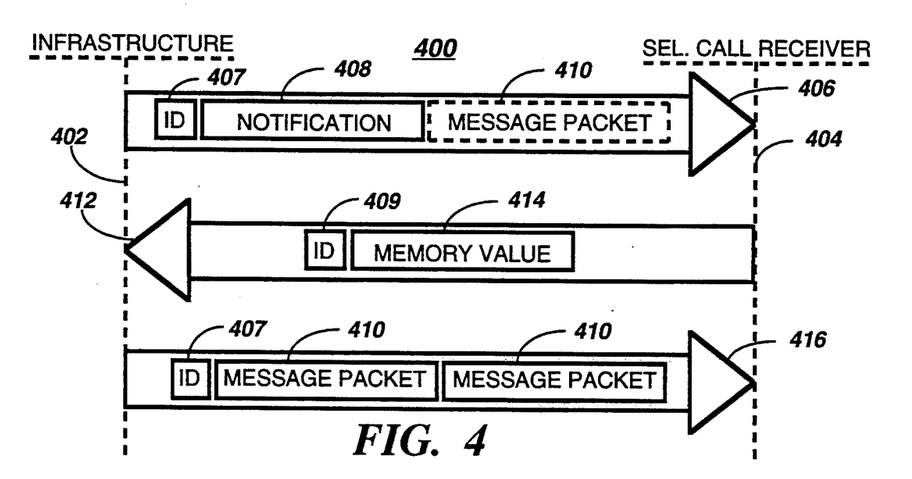
FIG. 4 is a protocol diagram depicting transactions transmitted between the infrastructure and the selective call receiver in accordance with the preferred embodiment of the present invention, the transactions beginning when sufficient receiver memory is available.

FIG. 4 is a protocol diagram 400 depicting transactions transmitted between the infrastructure 102 and the selective call receiver 120 in accordance with the preferred embodiment of the present invention. The transactions depicted in the protocol diagram 400 are those which occur wherein the controller 110 determines that sufficient receiver memory space is available in the selective call receiver 120 for receiving a pending message. The infrastructure 102 is represented by an infrastructure dashed line 402, while the selective call receiver 120 is represented by a selective call receiver dashed line 404. Each transaction is represented by a box arrow. A box arrow directed from the infrastructure dashed line 402 to the selective call receiver dashed line 404, e.g., the notification transaction 406, is a transaction transmitted from the infrastructure 102 to the selective call receiver 120. A box arrow directed from the selective call receiver dashed line 404 to the infrastructure dashed line 402, e.g., the memory value transaction 412, is a transaction transmitted from the selective call receiver 120 to the infrastructure 102.

The notification transaction 406 comprises an identifier (ID) 407 for identifying the selective call receiver 120 for which a pending message has been received by the infrastructure 102. The ID 407 preferably is followed by a notification element 408 for notifying the selective call receiver 120 of the pending message. Optionally, the notification transaction 406 can comprise at least one message packet 410 including a portion of the pending message. Alternatively, for systems that send the at least one message packet 410, the at least one message packet 410 itself inherently is a notification that there is a pending message; thus, the sending of the notification element 408 becomes optional in such systems.

The selective call receiver 120 responds to the notification transaction 406 by sending the memory value transaction 412, comprising an ID 409 for identifying the responding selective call receiver 120, and a memory value 414 specifying the amount of memory space in the selective call receiver 120 for storing the pending message. As stated earlier, the ID 409 is preferably the same as the ID 407. In alternative systems, however, the ID 409 may differ from the ID 407, depending on design choice.

The controller 110 of the infrastructure 102 compares the memory value 414 with the length of the pending message for the identified selective call receiver 120, the length being computed in a conventional manner. Having determined that there is sufficient memory space within the selective call receiver 120 for storing the pending message, the controller 110 of the infrastructure 102 responds with a message transaction 416. The message transaction 416 comprises the ID 407, followed by the at least one message packet 410 comprising the pending message.

It will be appreciated that other acknowledge-back transactions, such as the "cannot comply" response mentioned earlier herein, can occur in the acknowledge-back selective call communication system 100. Such other transactions are not depicted in the protocol diagrams of FIGS. 4–8, as they are not considered germane to the described embodiments of the present invention.

Figure 5:
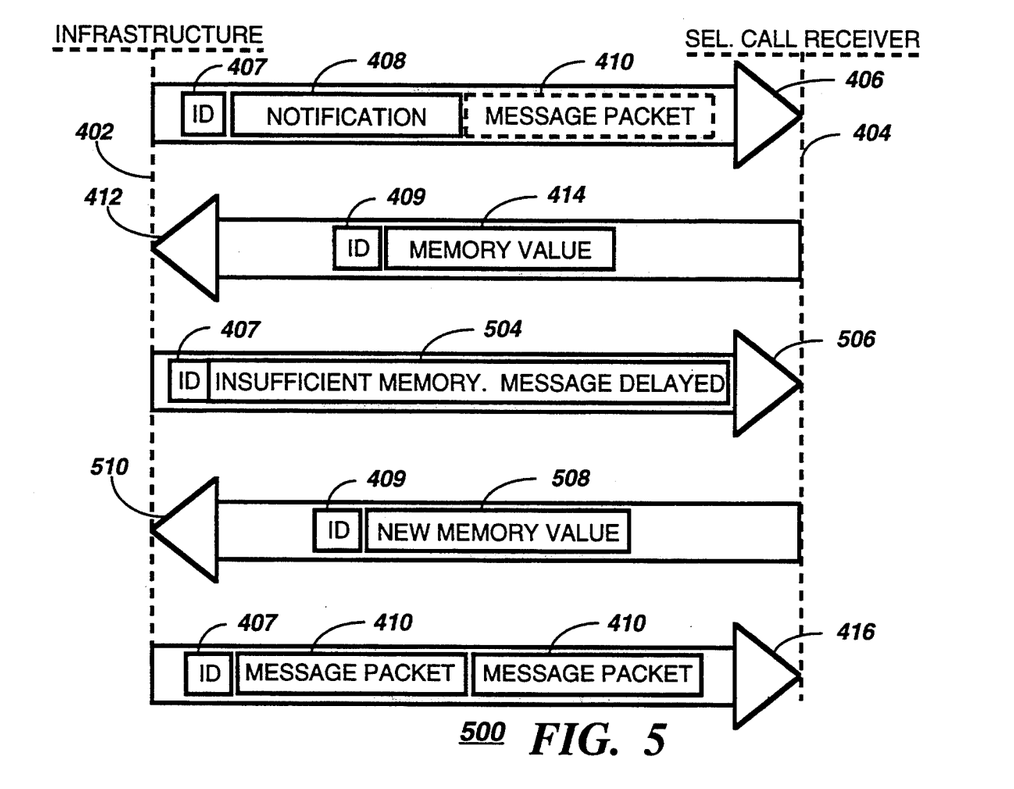
FIG. 5 is a protocol diagram depicting transactions transmitted between the infrastructure and the selective call receiver in accordance with the preferred embodiment of the present invention, the transactions beginning when insufficient receiver memory is available.

FIG. 5 is a protocol diagram 500 depicting transactions transmitted between the infrastructure 102 and the selective call receiver 120 in accordance with the preferred embodiment of the present invention. The transactions depicted in the protocol diagram 500 are those which occur wherein the controller 110 determines that insufficient receiver memory space is available in the selective call receiver 120 for receiving a pending message. The first two transactions are the notification transaction 406 and the memory value transaction 412 described previously for the protocol diagram 400. Having determined, however, that there is insufficient memory space within the selective call receiver 120 for storing the pending message, the infrastructure responds to the memory value transaction 412 with an insufficient memory transaction 506. The insufficient memory transaction 506 comprises the ID 407, followed by an insufficient memory message 504.

Some time later, after the user of the selective call receiver 120 has received an indication of the memory insufficiency and has taken measures to make more memory available in the selective call receiver 120, e.g., the user has discarded an old message, the selective call receiver 120 transmits to the infrastructure an unsolicited memory value transaction 510. The transaction 510 comprises the ID 409 and a new memory value 508. The infrastructure compares the new memory value 508 with the length of the pending message for the identified selective call receiver 120, and if memory space is determined to be sufficient, responds with the message transaction 416.

Thus, the preferred embodiment of the present invention advantageously provides a method and apparatus that can control the loss of new incoming messages when there is insufficient memory available in the selective call receiver 120 for storing the new messages. The method and apparatus stores a pending message in the infrastructure 102 when there is insufficient memory space in the selective call receiver 120, and brings the problem to the attention of the user of the selective call receiver 120 for correction of the memory insufficiency. After correction of the memory insufficiency, the infrastructure 102 advantageously and automatically sends the stored pending message to the selective call receiver 120, in accordance with the preferred embodiment of the present invention.

Figure 6:
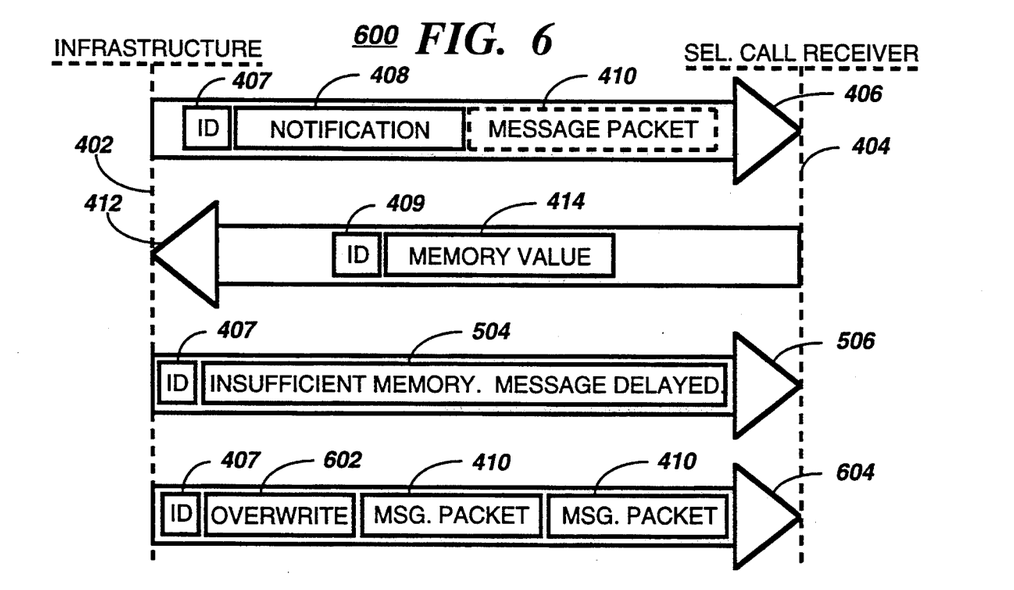
FIG. 6 is a protocol diagram depicting transactions transmitted between the infrastructure and the selective call receiver in accordance with a first alternative embodiment of the present invention, the transactions beginning when insufficient receiver memory is available.

FIG. 6 is a protocol diagram 600 depicting transactions transmitted between the infrastructure 102 and the selective call receiver 120 in accordance with a first alternative embodiment of the present invention. The transactions depicted in the protocol diagram 600 are those which occur wherein the controller 110 determines that insufficient receiver memory space is available in the selective call receiver 120 for receiving a pending message. The first three transactions are the notification transaction 406, the memory value transaction 412, and the insufficient memory transaction 506 described previously for the protocol diagrams 400 and 500.

After determining that there is insufficient memory in the selective call receiver 120, the first alternative embodiment informs the message source 104 accordingly and requests the message source 104 to choose a further message processing step, preferably selected from (1) canceling the pending message, (2) delivering the pending message after memory space becomes available in the selective call receiver 120, and (3) delivering the pending message by overwriting other messages stored in the selective call receiver 120. In FIG. 6 the message source 104 has chosen to deliver the pending message by overwriting other messages stored in the selective call receiver 120. The fourth transaction of the protocol diagram 600 is therefore an overwrite transaction 604, comprising the ID 407, an overwrite command 602, and the at least one message packet 410. Of course, if the message source 104 chooses the further message processing step of (2) delivering the pending message after memory space becomes available in the selective call receiver 120, then the corresponding protocol diagram for the first alternative embodiment will be similar to the protocol diagram 500 for the preferred embodiment.

Figure 7:
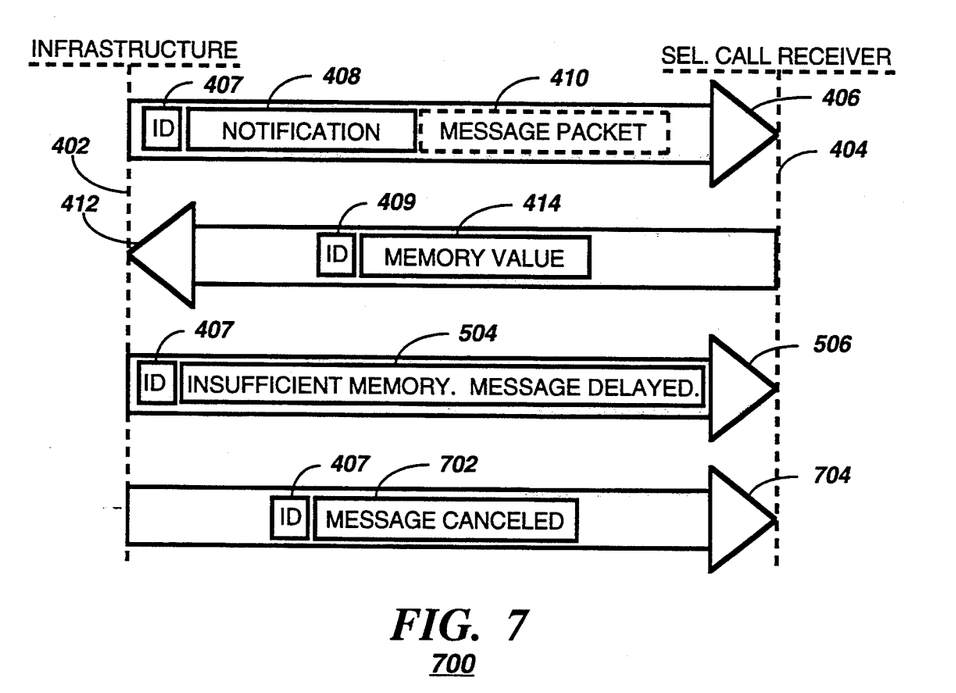
FIG. 7 is a protocol diagram depicting transactions transmitted between the infrastructure and the selective call receiver in accordance with the first alternative embodiment of the present invention, the transactions beginning when insufficient receiver memory is available.

FIG. 7 is a protocol diagram 700 depicting transactions transmitted between the infrastructure 102 and the selective call receiver 120 in accordance with the first alternative embodiment of the present invention. The transactions depicted in the protocol diagram 700 are those which occur wherein the controller 110 determines that insufficient receiver memory space is available in the selective call receiver 120 for receiving a pending message. The protocol diagram 700 is similar to the protocol diagram 600, the essential difference being that the message source 104 has chosen to cancel the pending message. Thus, the fourth transaction of the protocol diagram 700 is a message canceled transaction 704, comprising the ID 407, followed by a message canceled message 702.

It will be appreciated that interactive message processing control by the message source 104 as described above for the first alternative embodiment can perform quite satisfactorily if the message source is a computer or an E-mail system. Interactive message processing control can become somewhat impractical, however, if the system 100 operates with a high degree of latency, e.g., several minutes, between message entry and message delivery, and the message source 104 is a person calling by telephone. For such systems it is desirable to be able to respond to telephone callers substantially immediately at the time of message entry.

One way of responding immediately would be to store a last received memory value in the RAM 210 of the controller 110 for each selective call receiver 120 utilizing the system 100. The last received memory value would be updated by the controller 110 after each memory value transaction 412 and after each unsolicited memory value transaction 510 from the corresponding selective call receiver 120. Upon receipt of a message and identifier from the message source 104, the processor 204 would access the last received memory value 414 (or new memory value 508) corresponding to the identified selective call receiver 120, and would respond to the message source 104 in accordance with the last received memory value 414, 508.

Figure 8:
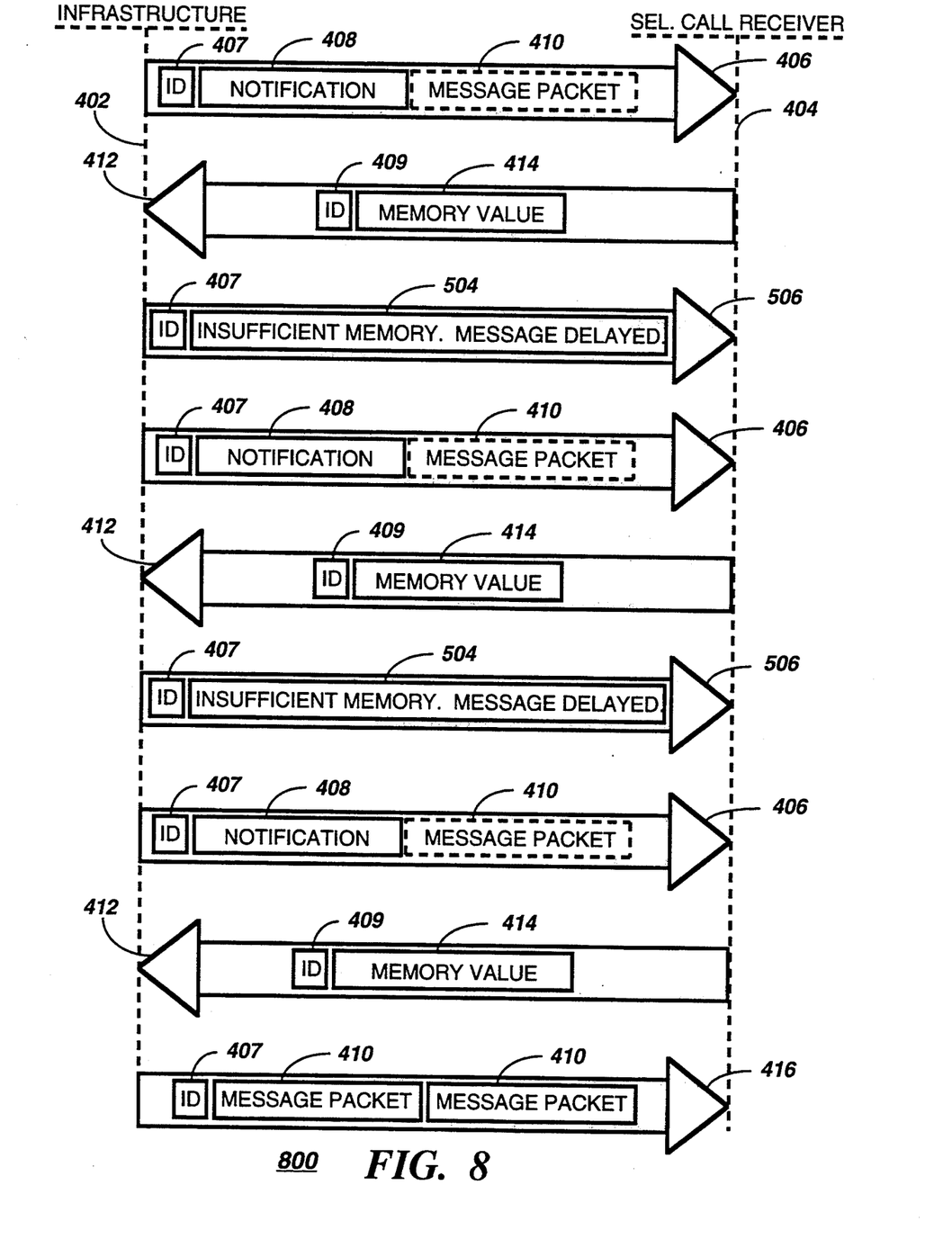
FIG. 8 is a protocol diagram depicting transactions transmitted between the infrastructure and the selective call receiver in accordance with a second alternative embodiment of the present invention, the transactions beginning when insufficient receiver memory is available.

FIG. 8 is a protocol diagram 800 depicting transactions transmitted between the infrastructure 102 and the selective call receiver 120 in accordance with a second alternative embodiment of the present invention. The transactions depicted in the protocol diagram 800 are those which occur wherein the controller 110 determines that insufficient receiver memory space is available in the selective call receiver 120 for receiving a pending message. In the second alternative embodiment the infrastructure periodically sends repeated notifications of the pending message to the selective call receiver 120 until the selective call receiver 120 returns a memory value 414 that indicates sufficient memory space is available for storing the pending message. The protocol diagram 800 comprises the notification transaction 406, followed by the memory value transaction 412, followed by the insufficient memory transaction 506. After a delay, the notification transaction 406 is again transmitted, followed by the memory value transaction 412, followed by the insufficient memory transaction 506. The transactions repeat in a similar manner until the memory value transaction 412 indicates a sufficient amount of memory space in the selective call receiver 120 for storing the pending message, after which the message transaction 416 occurs.

Figure 9:
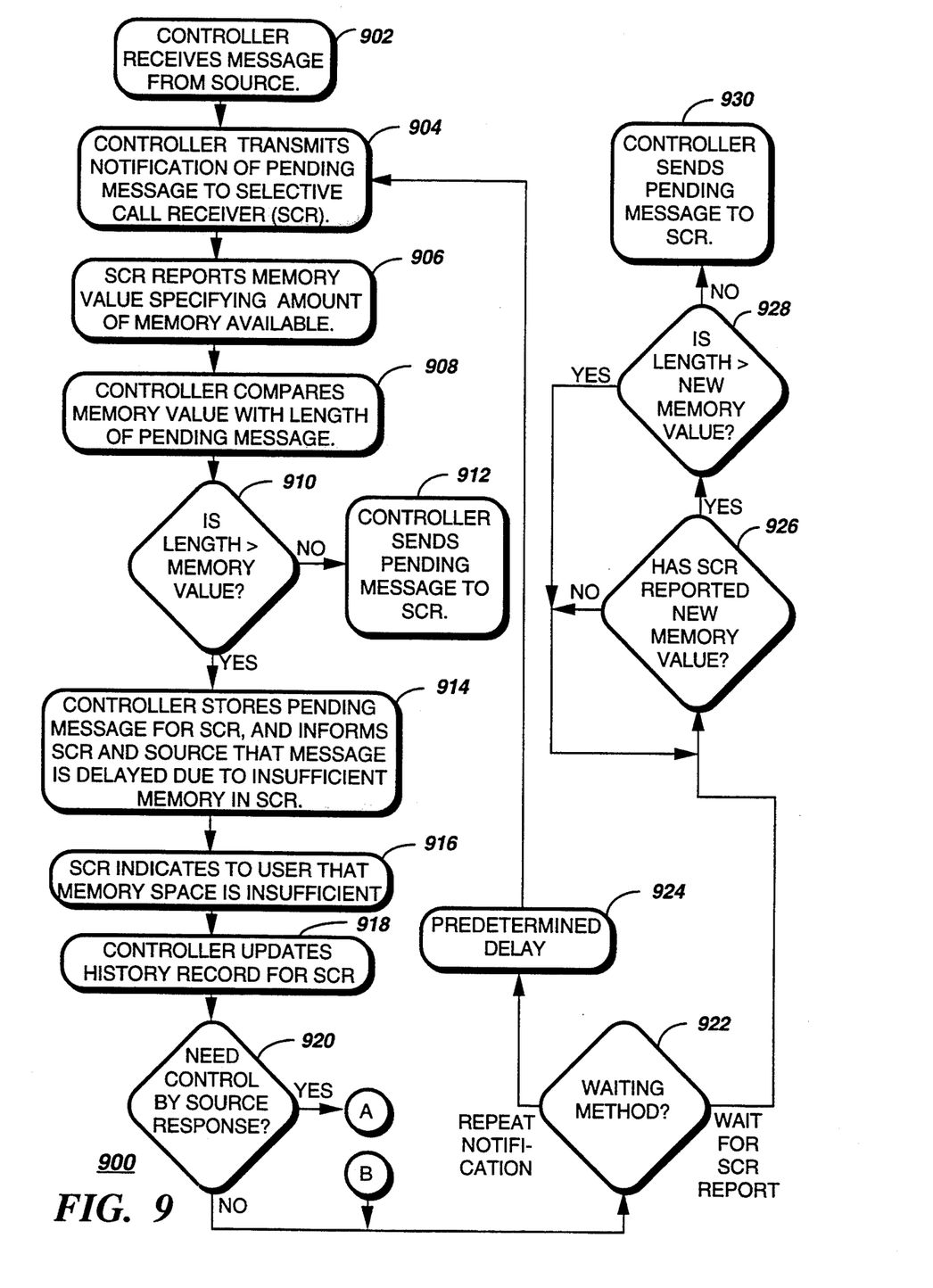
FIGS. 9 and 10 are flow charts depicting operation of the communication system in accordance with the preferred, first alternative, and second alternative embodiments of the present invention.
Figure 10:
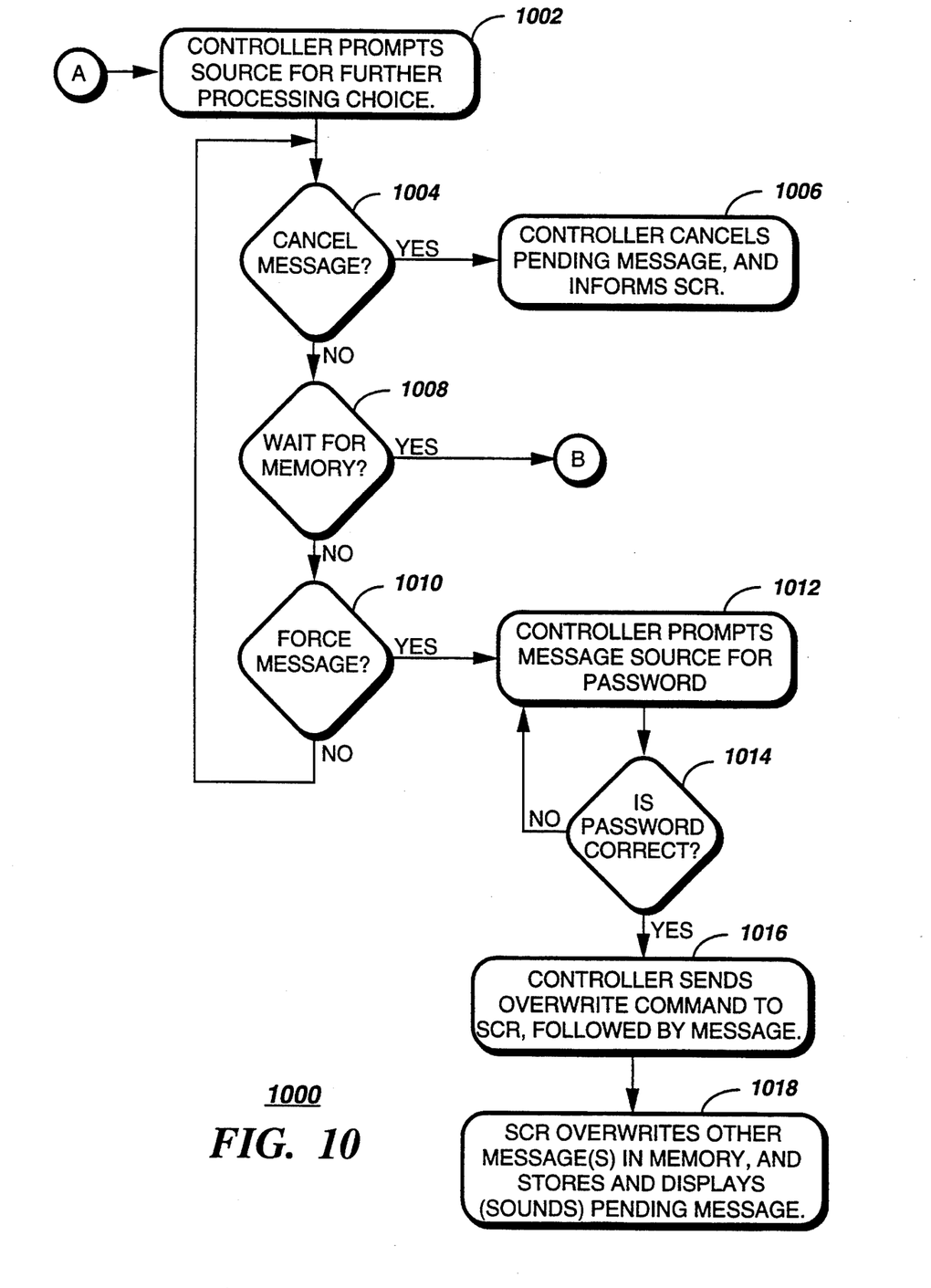

FIGS. 9 and 10 are flow charts 900, 1000 depicting operation of the communication system in accordance with the preferred, first alternative, and second alternative embodiments of the present invention. It will be appreciated that the transactions occurring between the infrastructure 102 and the selective call receiver 120 preferably are performed in accordance with the applicable protocol diagram 400, 500, 600, 700, 800. The process begins in the flow chart 900 when the input element 208 of the controller 110 receives 902 over the at least one input link 118 a message intended for a selective call receiver 120 from the message source 104. In response, the processor 204 of the controller 110 accesses the transmitter/receiver interface and encoder/decoder 202 to communicate with the at least one message transmitter 106 over the communication link 112 to transmit 904 the notification transaction 406 to the selective call receiver 120.

In response, the processor 308 of the selective call receiver 120 checks the RAM 322 to determine how much memory space is available for storing the pending message. The processor 308 then accesses the acknowledge transmitter 124 and antenna switch 304 to report 906, by the memory value transaction 412, the memory value 414, which specifies the amount of memory space available. The at least one acknowledge receiver 108 receives the memory value transaction 412 and communicates the memory value 414 to the controller 110 over the communication link 112. The processor 204 of the controller 110 then accesses the comparator element 222 to compare 908 the memory value 414 with the length of the pending message for the selective call receiver 120. In step 910 the processor 204 determines whether the length of the pending message is greater than the amount of space the memory value 414 indicates is available. If not, the processor 204 accesses the sender element 224 to control the transmitter/receiver interface and encoder/decoder 202 to communicate with the at least one message transmitter 106 over the communication link 112 to send 912 the pending message to the selective call receiver 120 by the message transaction 416.

If, on the other hand, in step 910 the processor 204 determines that the length of the pending message is greater than the memory space available in the selective call receiver 120 for storing the pending message, then the processor 204 accesses the message storer element 225 to store 914 the pending message, the ID of the associated selective call receiver 120, and a time stamp as one of the plurality of message records 214 in the RAM 210. If the notification transaction 406 comprised a message packet 410, the processor 204 also accesses the abort element 234 to abort sending any further packets of the pending message at this time. In addition, the processor 204 accesses the informer element 226 to control the transmitter/receiver interface and encoder/decoder 202 to send the insufficient memory transaction 506 to the selective call receiver 120. The processor 204 also accesses the advisor element 232 to control the input element 208 to inform the message source 104, e.g., by a conventional data, tone, or voice prompt, that the pending message is delayed due to insufficient memory space in the selective call receiver 120.

In response to receiving the insufficient memory transaction 506, the selective call receiver 120 utilizes the indicator 320 to indicate 916 to its user that memory space is insufficient to receive the pending message. In addition, the processor 204 of the controller 110 updates 918 one of the history records 218 for the selective call receiver 120 in the history storage area 216 of the RAM 210. Next, the processor 204 accesses the choice enabler element 238 to determine 920 whether a need exists for a further processing control choice by the message source 104, i.e., whether: (1) such choice is available in the system 100, and (2) such choice has not been previously made by the message source 104. If both conditions are true, then flow moves to the flow chart 1000 (FIG. 10), where the processor 204 controls the input element 208 to generate 1002 a conventional data, tone, or voice prompt to request the message source 104 to select a further processing choice.

If in step 1004 the choice is to cancel the message, then the processor 204 accesses the further processing element 236 to cancel 1006 the pending message by deleting the pending message from the RAM 210 and further by sending the message canceled transaction 704 to the selective call receiver 120 in the usual manner. If in step 1004 the step is not to cancel the pending message, then if in step 1008 the choice is to wait for memory availability, the flow returns to the flow chart 900 at step 922, which is described herein below. If, on the other hand, in step 1008 the choice is not to wait for memory availability, then if in step 1010 the choice is to force delivery of the message, the processor 204 accesses the security element 240 to control the input element 208 to generate 1012 a conventional data, tone, or voice prompt for entry of a password. It will be appreciated that the password can be related algorithmically to the ID of the selective call receiver 120, or preprogrammed individually by the user of the selective call receiver 120 in a manner well known in the art.

Next, the processor 204 checks 1014 whether a correct password has been entered. If not, the flow returns to step 1012 to again prompt for the password. When the correct password has been entered, the flow moves to step 1016, where the processor 204 sends the overwrite transaction 604 to the selective call receiver 120 in the normal manner. In response, the selective call receiver 120 overwrites other messages in the RAM 322 to make space available for the pending message, and displays (or audibly reproduces) the pending message. If, on the other hand, no choice has yet been made in steps 1004, 1008, 1010, then the processor continues waiting for a choice to be made by the message source 104.

If in step 920 (FIG. 9) there is no need for a further processing control choice by the message source 104, then the flow moves to step 922 to determine the waiting method to be used for waiting for memory space to become available in the selective call receiver 120. Preferably, the waiting method is to wait for the selective call receiver 120 to report a new memory value 508 by sending the unsolicited memory value transaction 510 in response to additional memory space becoming available therein. If that is the waiting method for the system 100, then flow moves to step 926, where the processor 204 waits for the selective call receiver 120 to transmit the unsolicited memory value transaction 510. When the same is received, the processor 204 accesses the comparator element 222, and checks 928 whether the length of the pending message is still greater than the new memory value 508. If so, the processor 204 returns to step 926 to wait for transmission of another new memory value 508. If, on the other hand, in step 928 the length of the pending message is not greater than the new memory value 508, then the processor 204 accesses the delayed transmission element 230 to control the transmitter/receiver interface and encoder/decoder 202 to communicate with the at least one message transmitter 106 over the communication link 112 to send 930 the delayed pending message to the selective call receiver 120 by the message transaction 416.

On the other hand, if in step 922 the waiting method for the system 100 is repeat notification, then flow moves to step 924, where the processor 204 waits for a predetermined delay. At the end of the predetermined delay the flow returns to step 904, where the processor 204 will again transmit the notification transaction 406 to the selective call receiver 120.

Thus, it should now be clear that the present invention advantageously provides a method and apparatus that can minimize the loss of new incoming messages due to insufficient memory space being available in the selective call receiver for storing the new messages. The method and apparatus advantageously can bring the memory problem to the attention of the user of the selective call receiver, thereby allowing the user to correct the problem by deleting old messages from the memory. The method and apparatus further can bring the problem to the attention of the message source, and can provide a choice of further message processing steps selectable by the message source. The method and apparatus also can provide a history of messages delayed because of insufficient memory. The history can be utilized to identify users who are experiencing an inordinate amount of delayed messages, so that the problem can be corrected.

What is claimed is:

1. A method of remote memory management in an acknowledge-back selective call communication system comprising an infrastructure and a selective call receiver that receives a plurality of messages having a length that is variable, the messages each originating from a source and transmitted by the infrastructure, wherein the selective call receiver stores the plurality of messages in a memory, the method comprising the steps of:

transmitting, from the infrastructure to the selective call receiver, a notification of a pending message;

reporting in response to the notification, from the selective call receiver to the infrastructure, a memory value specifying an amount of space available in the memory for storing the pending message;

comparing by the infrastructure the memory value with the length of the pending message to make a determination of whether sufficient memory space is available to store the pending message in the selective call receiver; and controlling further processing of the pending message by the infrastructure in accordance with the determination made in the comparing step.

2. The method of claim 1, wherein the controlling step comprises the steps of:

sending the pending message to the selective call receiver in response to determining in the comparing step that sufficient memory space is available; and storing the pending message in the infrastructure for later transmission in response to determining in the comparing step that insufficient memory space is available.

3. The method of claim 1, wherein the controlling step comprises the step of informing the selective call receiver that the pending message will be delayed because of insufficient memory space available in the selective call receiver, in response to determining in the comparing step that insufficient memory space is available.

4. The method of claim 1, wherein the method further comprises the step of indicating by the selective call receiver to a user thereof that the memory space of the selective call receiver is insufficient to receive the pending message, in response to being so informed by the infrastructure.

5. The method of claim 1, wherein the controlling step comprises the step of retransmitting the notification of the pending message after a predetermined delay, in response to having determined subsequent to a most recent prior transmission of the notification that insufficient memory space was available in the selective call receiver.

6. The method of claim 1, further comprising the step of reporting a new memory value from the selective call receiver to the infrastructure, in response to an increase in the amount of space available in the memory for storing the pending message, the increase occurring after the selective call receiver has been informed by the infrastructure that the pending message is delayed because of insufficient memory space available in the selective call receiver.

7. The method of claim 1, wherein the controlling step comprises the steps of:

storing the pending message for the selective call receiver for later transmission in response to determining in the comparing step that insufficient memory space is available; and transmitting to the selective call receiver the pending message stored, in response to receiving a new memory value from the selective call receiver that indicates that sufficient memory space has become available to store the pending message in the selective call receiver.

8. The method of claim 1, wherein the controlling step comprises the step of advising the source of the pending message that the pending message will not be sent to the selective call receiver until additional memory space becomes available therein, in response to determining in the comparing step that insufficient memory space is available.

9. The method of claim 1, further comprising the step of storing by the infrastructure a history of remote memory management transactions for the selective call receiver, the history providing a quantitative record of messages delayed because of insufficient space available in the memory of the selective call receiver.

10. The method of claim 1, wherein the notification of the pending message comprises a transmission of a first packet of the pending message, and wherein the controlling step comprises aborting transmission of additional packets of the pending message, in response to determining in the comparing step that insufficient memory space is available.

11. The method of claim 1, further comprising the steps of:

enabling the source of the pending message, in response to determining in the comparing step that insufficient memory space is available, to choose a further message processing step selected from:
canceling the pending message,
delivering the pending message after sufficient memory becomes available in the selective call receiver, and
delivering the pending message by overwriting other messages stored in the selective call receiver; and further processing the pending message by the communication system in accordance with the further message processing step chosen by the source of the pending message.

12. The method of claim 11, wherein the enabling step requires entry of a password before enabling the source of the pending message to choose to deliver the pending message by overwriting other messages stored in the selective call receiver.

13. An acknowledge-back selective call communication system that performs remote memory management, the system comprising:

an infrastructure that transmits a plurality of messages having a length that is variable; and a selective call receiver coupled to the infrastructure for receiving and storing selected ones of the plurality of messages, wherein the infrastructure comprises:

a controller for controlling the infrastructure to process a pending message originated by a source, the controller comprising an input element coupled to the source for receiving the pending message; and a message transmitter coupled to the controller for transmitting to the selective call receiver a notification of the pending message, and wherein the selective call receiver comprises:

a message receiver coupled to the message transmitter for receiving the notification and the selected ones of the plurality of messages;

a memory coupled to the message receiver for storing the selected ones of the plurality of messages;

a processor coupled to the memory for controlling the selective call receiver;

a selective call address element coupled to the processor for selecting messages intended for the selective call receiver; and an acknowledge transmitter coupled to the processor for transmitting to the infrastructure in response to the notification a memory value specifying an amount of space available in the memory for storing the pending message, and wherein the infrastructure further comprises an acknowledge receiver coupled to the acknowledge transmitter for receiving the memory value, and wherein the controller comprises a comparator element coupled to the acknowledge receiver for comparing the memory value with the length of the pending message to make a determination of whether sufficient memory space is available to store the pending message in the selective call receiver, and for controlling the processing of the pending message in accordance with the determination made.

14. The system of claim 13, wherein the controller comprises:

a sender element coupled to the comparator element for sending the pending message to the selective call receiver in response to determining by the comparator element that sufficient memory space is available; and a message storer element coupled to the comparator element for retaining the pending message in storage in the infrastructure for later transmission in response to determining by the comparator element that insufficient memory space is available.

15. The system of claim 13, wherein the controller comprises an informer element coupled to the comparator element for informing the selective call receiver that the pending message will be delayed because of insufficient memory space available in the selective call receiver, in response to determining by the comparator element that insufficient memory space is available.

16. The system of claim 13, wherein the selective call receiver further comprises an indicator element coupled to the processor for indicating to a user thereof that the memory space of the selective call receiver is insufficient to receive the pending message.

17. The system of claim 13, wherein the controller comprises:

a message storage element coupled to the comparator element for storing the pending message for the selective call receiver for later transmission; and a repeater element coupled to the message transmitter and coupled to the message storage element for retransmitting the notification of the pending message after a predetermined delay, in response to having determined subsequent to a most recent prior transmission of the notification that insufficient memory space was available in the selective call receiver.

18. The system of claim 13, wherein the selective call receiver further comprises a reporter element coupled to the processor for reporting a new memory value to the infrastructure, in response to an increase in space available in the memory for storing the pending message, the increase occurring after the selective call receiver has been informed by the infrastructure that the pending message is delayed because of insufficient memory space available in the selective call receiver.

19. The system of claim 13, wherein the controller comprises:

a message storage element coupled to the comparator element for storing the pending message for the selective call receiver for later transmission, in response to determining by the comparator element that insufficient memory space is available; and a delayed transmission element coupled to the message transmitter and coupled to the message storage element for transmitting to the selective call receiver the pending message stored, in response to receiving a new memory value from the selective call receiver that indicates that sufficient memory space has become available to store the pending message in the selective call receiver.

20. The system of claim 13, wherein the controller comprises an advisor element coupled to the input element for advising the source of the pending message that the pending message will not be sent to the selective call receiver until additional memory space becomes available therein, in response to determining by the comparator element that insufficient memory space is available.

21. The system of claim 13, wherein the controller comprises a history storage element coupled to the comparator element for storing by the infrastructure a history of remote memory management transactions for the selective call receiver, the history providing a quantitative record of messages delayed because of insufficient space available in the memory of the selective call receiver.

22. The system of claim 13, wherein the notification of the pending message comprises a transmission of a first packet of the pending message, and wherein the controller comprises an abort element coupled to the comparator element for aborting transmission of additional packets of the pending message, in response to determining by the comparator element that insufficient memory space is available.

23. The system of claim 13, wherein the controller further comprises:

a choice enabler element coupled to the comparator element for enabling the source of the pending message, in response to determining by the comparator element that insufficient memory space is available, to choose a further message processing step selected from:

canceling the pending message, delivering the pending message after sufficient memory becomes available in the selective call receiver, and delivering the pending message by overwriting other messages stored in the memory of the selective call receiver; and a further processing element coupled to the input element for further processing the pending message by the communication system in accordance with the further message processing step chosen by the source of the pending message.

24. The system of claim 23, wherein the choice enabler element comprises a security element coupled to the input element for requiring entry of a password before enabling the source of the pending message to choose to deliver the pending message by overwriting other messages stored in the memory of the selective call receiver.

* * * * *